Dec. 5, 1967  YASUHISA YOSHIDA ET AL  3,356,785
ELECTRIC TRANSMISSION COAXIAL CABLES

Filed Dec. 29, 1964  3 Sheets-Sheet 2

CONDUCTIVE ANNULAR FITTING

INVENTORS
YASUHISA YOSHIDA &
MASAKAZU SUZUKI
BY

THEIR ATTORNEY

Dec. 5, 1967 YASUHISA YOSHIDA ETAL 3,356,785
ELECTRIC TRANSMISSION COAXIAL CABLES
Filed Dec. 29, 1964 3 Sheets-Sheet 3

INVENTORS
YASUHISA YOSHIDA &
MASAKAZU SUZUKI
BY
THEIR ATTORNEY ial # United States Patent Office 3,356,785
Patented Dec. 5, 1967

3,356,785
ELECTRIC TRANSMISSION COAXIAL CABLES
Yasuhisa Yoshida, Nishinomiya, and Masakazu Suzuki, Osaka, Japan, assignors to Sumitomo Electric Industries, Ltd., Osaka, Japan, a company of Japan
Filed Dec. 29, 1964, Ser. No. 421,898
Claims priority, application Japan, May 27, 1964, 39/41,127
15 Claims. (Cl. 174—28)

The present invention relates to the improvement of an electric cable, in which the conductor is in the interior of the cable and a metal casing on the outside thereof and concentrically supported by insulating spacers. The interior space between the conductor and the casing is filled with a liquid.

The present invention is directed to an electric cable which is suitable for the transmission of electric power of high electric energy such as high voltage and large current. The electric cable comprising this invention consists of a conductor in the interior thereof consisting of a pipe of an electroconductive metal such as copper, aluminum, etc. and an outside metallic casing made of an electroconductive metal such as copper, aluminum, etc. which is concentrically supported by insulating spacers relative to the conductor in the interior of the cable. A fluid insulating medium such as a pressure gas or insulating oil or the like is in between the conductor in the interior and the outside metallic casing.

In the above-mentioned cable, insulating spacers are interposed between the conductor in the interior and the outside metallic casing. As a result, the void parts at the contact surface between the insulating spacers and the conductor in the interior of the cable or the outside metallic casing have an increased potential gradient due to the difference in dielectric constant between the two, so that insulation breakdown always takes place in such parts due to transmission of high voltages and large currents. The principle objective of the present invention is to supply an improved electric cable free from the above-mentioned defect.

The first characteristic of the present invention is that in the above-described electric cable, a metallic or semi-conductive screening layer is provided in at least one of the coaxial surfaces where the insulating spacer contacts the conductor in the central interior or the outside metallic casing.

Another characteristic of the present invention is that in the above described electric cable, the insulating spacers are in the shape of a ring and are placed at intervals in the longitudinal direction of the cable. These insulating spacers have an annular groove on the surface of the part thereof in contact with the conductor in the interior or the outside metallic case. A metallic or semi-conductive screening layer is provided on the surface of the annular groove, while a metal fitting is provided in the annular groove to join electrically the screening layer of the annular groove and the conductor in the interior or the outside metal casing.

Another of the characteristics of the present invention is that the above described cable is an electric cable in which insulating spacers are positioned at intervals in the radial direction of the conductor and along the full length and in the longitudinal or axial direction of the cable. There are annular grooves on the surface of the parts of these insulating spacers contacting the conductor in the interior of the cable or the outside metal casing, a metallic or semi-conductive layer being provided on the surface of the annular grooves.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
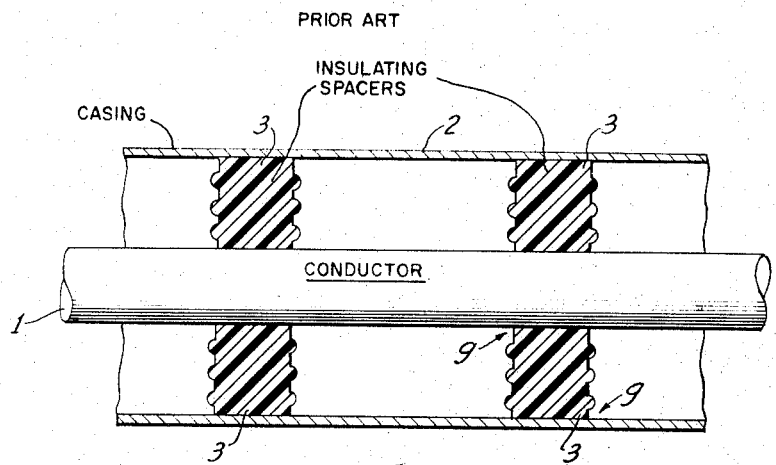
FIGURE 1 is a longitudinal section of an electric cable in which the conductor in the interior and the outside metal casing are concentrically supported by means of ring-shaped insulating spacers.

In FIGURE 1, the conductor 1 in the interior of the cable is made of a copper pipe or aluminum pipe or the like. The outside metal casing 2 is made of copper, aluminum or the like. The insulating spacers 3 are made of porcelain, plastic or the like and are positioned at intervals in the longitudinal direction of the cable to support the conductor in the center of the cable in concentrical relation with the outside metal casing. A fluid, such as dry air, nitrogen gas, or insulating oil, etc. is sealed in the area between the conductor 1 in the cable and the outside metal casing.

Figure 5:
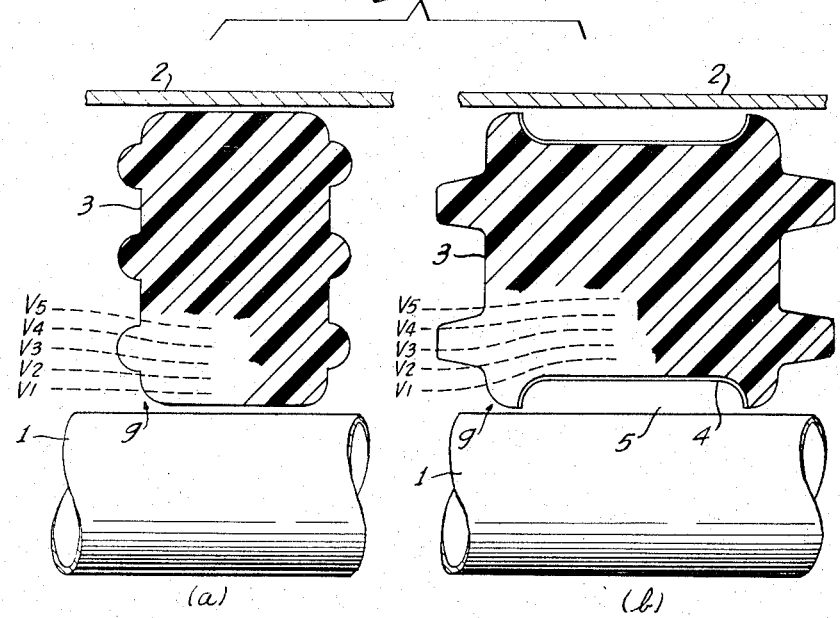
FIGURE 5 shows the distribution of electric field at the void part in the part where the conductor in the interior and the insulating spacer are in contact.

These types of electric cables are suitable for the transmission of high voltage and large current. However, as the voltage becomes higher, the gap $g$ produced between the contact parts of the insulating spacer 3 with the conductor 1 in the interior of the cable or the outside metal casing 2 will have an increased potential gradient as shown in FIGURE 5a owing to the difference between the dielectric constants of the two, and insulating breakdown always takes place at this point. As a result electric power cables of this type are found to have a poor efficiency where the voltage applied is extremely high.

The present invention supplies an economical power cable which is free from such defects and in which the efficiency of insulating spacers at applied high voltages is improved.

Figure 2:
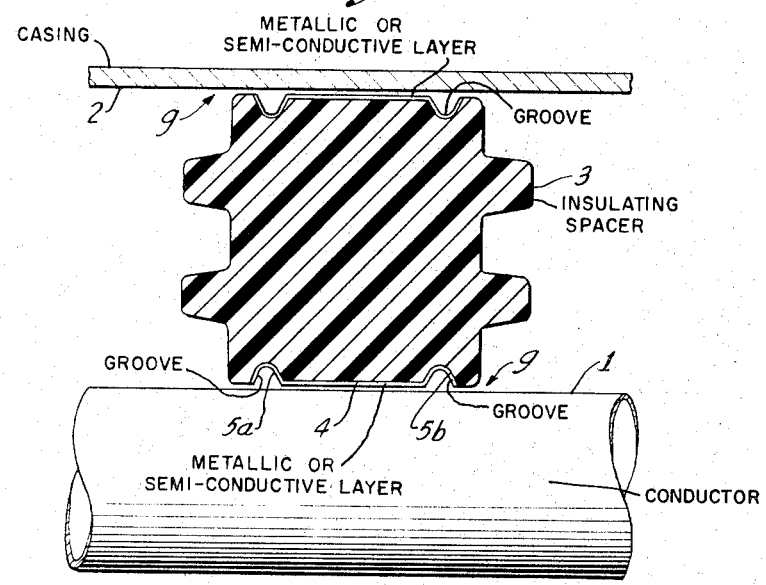
FIGURE 2 is an enlarged longitudinal section of the insulating spacer in the electric cable comprising this invention, showing an application wherein the insulating spacer has annular grooves near both ends of its cylindrical surfaces of the parts which contact with the conductor in the central interior of the cable and the outside metal casing.

In FIG. 2 there is shown an enlarged section of an insulating spacer in an embodiment of the present invention. The insulating spacer 3 has annular grooves 5a, 5b near both ends of the surface of the the parts which contact the conductor 1 in the interior of the cable and the outside metal casing 2. On the surface of these annular grooves 5a, 5b is provided a screening layer which is made of an evaporation-coating of a metal or of a metal attached or which is made of a metal piece previously formed therein, while a similar screening layer 4 is provided also on the surface connecting these annular grooves 5a, 5b. If a screening layer 4 is provided on the surface of the part of the insulating spacer 3 contacting the conductor 1 in the interior of the cable or the outside metal casing 2, the surface of the insulating spacer 3 becomes of equal potential to the conductor 1 in the interior of the cable as well as the outside metal casing 2, so that the potential gradient at the gap g in that portion where the spacer 3 and the conductor 1 contact each other decreases remarkably as shown in FIGURE 5b improving the withstand voltage characteristic.

Figure 3:
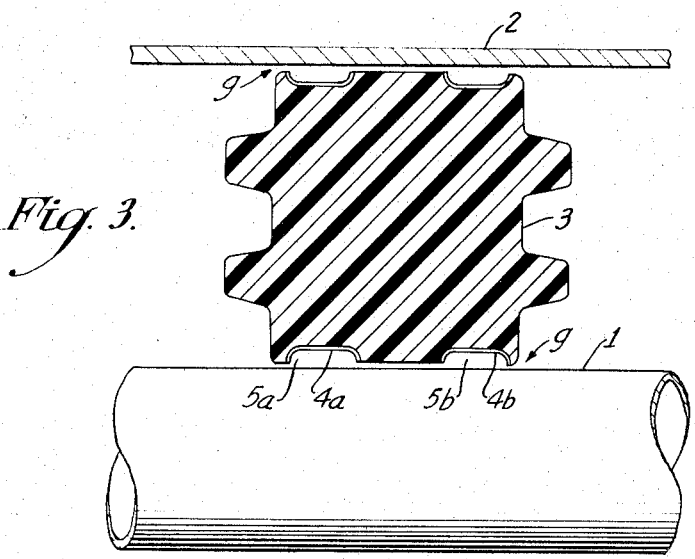
FIGURE 3 is an enlarged section of the insulating spaced in the electric cable showing another application of the present invention wherein the annular grooves are located near both ends of the parts of the insulating spacer which contact the conductor in the interior of the cable and the outside metal casing and the surface of these annular grooves is provided with a screening layer.

FIGURE 3 shows another embodiment of the present invention. Here screening layers 4a, 4b are provided on the surfaces of the annual grooves 5a, 5b of the insulating spacer 3, respectively, but these screening layers are not electrically connected. In this case, too, an effect almost similar to that of the embodiment shown in FIGURE 2 can be expected.

Figure 4:
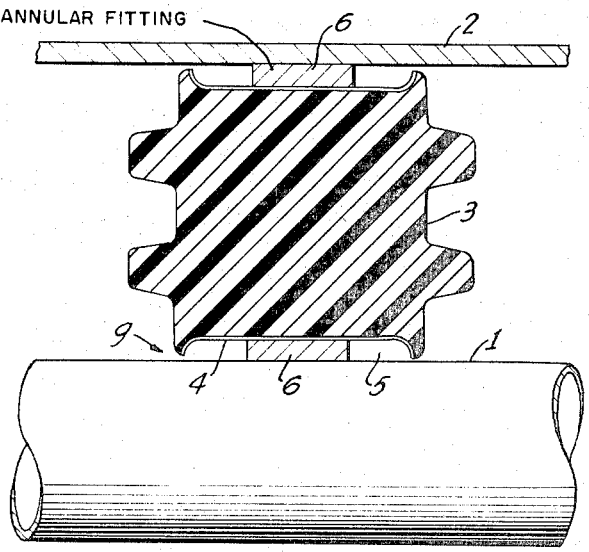
FIGURE 4 is an enlarged section of the insulating spacer in the electric cable showing still another application of the present invention wherein a metal fitting is provided between the surface of the annular groove and the conductor in the interior of the cable and outside metal casing for their electrical connection.

In FIGURE 4, the insulating spacer 3 has an annular groove 5 over the whole surface of the part which contact the conductor 1 in the interior of the cable or the outside metal casing 2. A screening layer 4 is provided on the surface of the groove 5, and a metal annular fitting 6 is provided between the conductor 1 and the spacer 3 as well as the outside metal casing 2 and the spacer 3 to provide good electrical contact. By this arrangement, the surface of the insulating spacer 3 adjacent the conductor has a potential entirely equal to that of the conductor 1 and the surface of the spacer adjacent the metal casing has a potential equal to that of the outside metal casing 2, so that the effect of decreasing potential gradient at the gap g is further enhanced.

Figure 6:
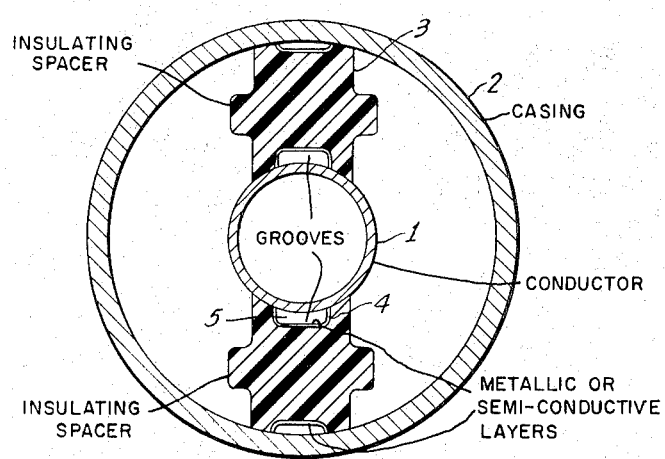
FIGURE 6 is a cross-sectional view of the cable comprising this invention showing another application of the present invention, wherein the insulating spacers are positioned at intervals in the radial direction of the conductor along the full length and in the longitudinal direction of the cable.

FIGURE 6 shows a variation of the embodiment of the present invention. Here, a plurality of insulating spacer 3 are placed at intervals in the radial direction relative to the conductor, along the full length and in the longitudinal direction of the cable. In this embodiment, too, annular grooves 5 are provided on the surface of the insulating spacers of the parts which contact the conductor 1 in the interior of the cable and the outside conductor 2, and a screening layer 4 is provided on their surfaces. The power cable of this type of structure also has the same result as those of the aforementioned embodiments wherein the effects of dielectric breakdown are minimized.

In the afore-mentioned embodiments, improvement at both parts of the insulating spacer contacting the conductor in the interior of the cable and the outside metal casing has been explained. However, the improvement is not necessarily needed in both of these coaxial surfaces. The means comprising this invention that has been described in these embodiments may be adopted in at least one of these coaxial surfaces.

The metallic or semiconductive screening layer is referred to in the claims as a conductive screening layer in order to indicate that the screening layer may be either a metallic conductor with good conductivity or a semiconductor.

We claim:

1. A fluid insulated electric transmission coaxial cable having an inner conductor concentrically supported by insulating spacers in an outer conductor, inner and outer insulating support surfaces on said insulating spacers in substantially continuous surface contact with the adjacent surfaces of said conductors, characterized by at least one continuous groove in and along at least one of said insulating support surfaces such that each marginal edge surface of each grooved insulating support surface is provided with a continuous groove edge therealong, conductive material in each of said grooves and extending in surface engagement therewith from said continuous groove edge to reduce the potential gradient at the juncture of each of said marginal edge surfaces and its adjacent conductor surface.

2. The electric transmission coaxial cable of claim 1 characterized by one of said grooves in at least one of said insulating support surfaces.

3. The electric transmission coaxial cable of claim 1 characterized in that at least one of said grooves is provided on each of said insulating support surfaces.

4. The electric transmission coaxial cable of claim 2 characterized in that said spacers are of annular shape and positioned at intervals along the length of said cable thereby providing annular grooves.

5. The electric transmission coaxial cable of claim 4 characterized by a plurality of said grooves in at least one of said insulating support surfaces in each of said spacers.

6. The electric transmission coaxial cable of claim 5 characterized by a conductive screening layer connecting said conductive material in each of said annular grooves.

7. The electric transmission coaxial cable of claim 4 characterized in that said annular grooves are provided in each of insulating support surfaces of said spacers.

8. The electric transmission coaxial cable of claim 4 characterized by an annular conductive fitting positioned in said annular grooves to electrically connect said conductive material to said adjacent conductor surface.

9. The electric transmission coaxial cable of claim 7 characterized by annular conductive fittings in said annular grooves to electrically connect said conductive material adjacent with said conductors.

10. A high energy electric transmission coaxial cable comprising an inner conductor, an outer conductor and insulating ring-shaped spacers having coaxial surfaces and intervally positioned in said outer casing to concentrically support said inner conductor within said outer conductor for the full length thereof, a fluid insulating medium sealed within the interior of the cable, at least one annular groove in at least one of said coaxial surfaces of said spacers such that each marginal edge surface of each grooved coaxial surface is provided with an annular groove edge therealong, a conductive screening layer in said annular grooves to reduce the potential gradient between said marginal edge surface and its adjacent conductor.

11. The high energy electric transmission coaxial cable of claim 10 characterized in that said annular grooves are in each of the coaxial surfaces of said spacers and a conductive screening layer in each of said grooves.

12. An electric transmission coaxial cable for the transmission of high electrical energy comprising a metallic conductor, an outer metallic casing, coaxial insulating spacers of longitudinal length having coaxial surfaces and symmetrically positioned about said conductor within said casing to concentrically support the same, a fluid insulating medium sealed within said casing at least one, longitudinal groove in at least one of said surfaces such that each marginal edge surface of each grooved coaxial surface is provided with a continuous grooved edge therealong and a conductive screening layer on the surface of each of said grooves.

13. The electric transmission coaxial cable of claim 12 characterized in that said grooves are in each of the coaxial surfaces of said spacers and a conductive screening layer is provided on the surfaces of each of said grooves.

14. The electric transmisison coaxial cable of claim 12 characterized in that said spacers are continuous for the full length of the cable.

15. The electric transmission coaxial cable of claim 12 characterized in that said spacers are intervally spaced along the full length of the cable.

References Cited
UNITED STATES PATENTS

| | | | |
|---|---|---|---|
| 1,795,939 | 3/1931 | Estorff | 174—111 X |
| 2,082,860 | 6/1937 | Walter | 174—28 |
| 2,096,840 | 10/1937 | Bormann. | |
| 2,204,737 | 6/1940 | Swallow et al. | 174—29 |
| 2,274,031 | 2/1942 | Bannon | 174—28 X |
| 2,428,051 | 9/1947 | Touraton | 174—28 |
| 2,597,867 | 5/1952 | Hansen | 174—28 X |
| 3,231,666 | 1/1966 | Frink | 174—142 |

LEWIS H. MYERS, *Primary Examiner.*

JOHN F. BURNS, *Examiner.*

D. A. KETTLESTRINGS, H. HUBERFELD,
*Assistant Examiners.*